(12) United States Patent
Kakehi et al.

(10) Patent No.: US 10,309,539 B2
(45) Date of Patent: Jun. 4, 2019

(54) SEAL RING

(71) Applicant: NTN CORPORATION, Osaka (JP)

(72) Inventors: Kohzoh Kakehi, Mie (JP); Takumi Kondou, Mie (JP)

(73) Assignee: NTN CORPORATION, Osaka (JP)

(*) Notice: Subject to any disclaimer, the term of this patent is extended or adjusted under 35 U.S.C. 154(b) by 6 days.

(21) Appl. No.: 15/516,636

(22) PCT Filed: Sep. 30, 2015

(86) PCT No.: PCT/JP2015/077684
§ 371 (c)(1),
(2) Date: Apr. 3, 2017

(87) PCT Pub. No.: WO2016/052595
PCT Pub. Date: Apr. 7, 2016

(65) Prior Publication Data
US 2018/0231127 A1 Aug. 16, 2018

(30) Foreign Application Priority Data
Oct. 1, 2014 (JP) .................................. 2014-203322

(51) Int. Cl.
F16J 9/14 (2006.01)
F16J 15/3248 (2016.01)
(Continued)

(52) U.S. Cl.
CPC ........... F16J 15/3248 (2013.01); F16J 15/18 (2013.01); F16J 15/441 (2013.01)

(58) Field of Classification Search
CPC .......... F16J 15/16; F16J 15/162; F16J 15/164; F16J 15/32; F16J 15/3248
See application file for complete search history.

(56) References Cited

U.S. PATENT DOCUMENTS 7,341,256 B2 * 3/2008 Nakaoka ............... F16J 15/441
277/496

7,523,944 B2 * 4/2009 Hatori .................... F16J 15/441
277/460
(Continued)

FOREIGN PATENT DOCUMENTS

CN 1275689 A 12/2000
CN 101563559 A 10/2009
(Continued)

OTHER PUBLICATIONS

International Search Report for PCT/JP2015/077684 dated Dec. 8, 2015.
(Continued)

Primary Examiner — Gilbert Y Lee
(74) Attorney, Agent, or Firm — Hedman & Costigan, P.C.; James V. Costigan; Kathleen A. Costigan

(57) ABSTRACT

The present invention provides a seal ring capable of maintaining excellent low torque generation performance for a long term. A seal ring (1) is mounted on an annular groove formed on one member consisting of either a housing having a shaft hole or a rotary shaft inserted into the shaft hole, partly projects from the annular groove and contacts a surface of other member consisting of either the housing or the rotary shaft, and slidably contacts a side wall surface of the annular groove at a non-sealed fluid side thereof, thereby sealing an annular gap between the one member and the other member. An outer diameter side (2a) of the side surface (2) of the ring to be subjected to at least the side wall surface of the annular groove is formed as an inclined surface having an inclined angle in such a way as to decrease a width of the ring from the outer diameter side of the side surface of the ring to an inner diameter side of the side surface thereof. A concave portion (3) which does not contact the side wall surface of the annular groove and communicates with an inner circumferential surface (1b) of the ring is formed on a portion of the inner diameter side (2b) of the side surface of the ring not projecting from the annular groove.

5 Claims, 11 Drawing Sheets

(51) Int. Cl.
*F16J 15/18* (2006.01)
*F16J 15/44* (2006.01)

(56) References Cited

U.S. PATENT DOCUMENTS

| | | | |
|---|---|---|---|
| 8,177,237 B2 * | 5/2012 | Lindner-Silwester | F16J 9/14 |
| | | | 277/435 |
| 2011/0140368 A1 | 6/2011 | Keck | |

FOREIGN PATENT DOCUMENTS

| | | |
|---|---|---|
| DE | 19713455 A1 | 10/1998 |
| JP | 08-121603 A | 5/1996 |
| JP | 09-210211 A | 8/1997 |
| JP | 2007-107547 A | 4/2007 |
| JP | 2008-144814 A | 6/2008 |
| JP | 2008-275052 A | 11/2008 |
| JP | 2013-155846 A | 8/2013 |

OTHER PUBLICATIONS

English Abstract for CN 1275689 A dated Dec. 6, 2000.
English Abstract for CN 101563559 A dated Oct. 21, 2009.

\* cited by examiner (a)

(b)

| | Sectional configuration of ring | Oil leak in initial stage | Oil leak after wear |
|---|---|---|---|
| Example 1 |  | ○ | ◎ |
| Comparative Example 1 |  | ◎ | ◎ |
| Comparative Example 2 |  | ○ | ◎ |

SEAL RING

TECHNICAL FIELD

The present invention relates to a seal ring to be used to seal a fluid such as hydraulic oil, the pressure of which is utilized in equipment such as an automatic transmission (hereinafter referred to as AT) and a continuously variable transmission (hereinafter referred to as CVT).

BACKGROUND ART

An oil seal ring for sealing hydraulic oil is mounted on necessary positions of equipment such as the AT and the CVT. For example, the oil seal ring is mounted on a pair of annular grooves formed on a rotary shaft inserted into a shaft hole of a housing by spacing the annular grooves at a certain interval so that a side surface and an inner circumferential surface of each oil seal ring receive the hydraulic oil supplied from an oil passage disposed between both annular grooves. An opposed side surface and an outer circumferential surface of each oil seal ring seal a side wall of the corresponding annular groove and the inner circumferential surface of the housing. A sealing surface of each seal ring slidably contact the side wall of the corresponding annular groove and the inner circumferential surface of the housing, with the sealing surfaces of both seal rings holding the hydraulic pressure of the hydraulic oil between both seal rings. The above-described oil seal is demanded to have a small frictional loss and a sufficiently high oil sealing performance. In recent years, to improve fuel consumption is an important problem to be solved. To this end, the seal ring is desired to maintain a satisfactory sealing performance and at the same time have improved low torque generation performance.

As such a seal ring, as shown in FIG. 9, the seal ring is proposed as disclosed in a patent document 1. FIG. 9 is partly cutaway view of the seal ring. As shown in FIG. 9, in the seal ring, a fluid flow path for introducing a fluid to be sealed thereinto is formed on the sliding contact surface 21 of the seal ring, and the projected portion 23 (the concave portion 22 is formed at both sides of the projected portion) is formed in the middle of the flow path to generate a dynamic pressure so that the surface pressure is decreased.

A seal ring as shown in FIG. 10 is proposed as disclosed in a patent document 2. FIG. 10 shows a state in which the seal ring is mounted on the annular groove. As shown in FIG. 10, the seal ring is mounted on the annular groove 31, and the curved concave portions 34 having the construction in which the edge of the end portion of the non-contact portion 33 is partly cut out are formed on the end portion of the non-contact portion 33 of the sliding contact surface 32.

In addition, there is proposed a seal ring in which the entire side surface is formed as a tapered surface (inclined surface) having a predetermined angle to allow the seal ring to achieve low torque generation and low friction property (see patent document 3).

PRIOR ART DOCUMENTS

Patent Documents

Patent document 1: Japanese Patent Application Laid-Open Publication No. 8-121603
Patent document 2: Japanese Patent Application Laid-Open Publication No. 2008-275052
Patent document 3: Japanese Patent Application Laid-Open Publication No. 2013-155846

SUMMARY OF THE INVENTION

Problems to be Solved by the Invention

In the case of the seal ring of the patent document 1, the dynamic pressure-caused production of the oil film formation effect can be expected at a high-speed rotation, but the oil film formation effect hardly appears at a low-speed rotation. Therefore, an oil film cannot be formed on the sealing surface (the portion of the sliding contact surface 21 which makes sliding contact with the annular groove) at the low-speed rotation. Thus, the construction of the seal ring is incapable of contributing to a decrease in torque and wear. As the reason, the apex of the projected portion 23 is disposed inward from the sliding contact surface 21 of the seal ring. At the time of the low-speed rotation, oil which has entered one concave portion 22 (lubricating groove) rides over the projected portion 23 and flows to the adjacent concave portion 22.

In the seal ring of the patent document 2, oil can be easily introduced into the sliding contact surface 32. Thus, the construction is excellent in the performance of forming an oil film on the sliding contact surface 32 from the time of the low-speed rotation until the time of the high-speed rotation. Thus, the seal ring is excellent in low torque generation performance. But on the other hand, the curved concave portion 34 having a large area cannot be formed on the sliding contact surface 32. Thus, a decrease in the sliding contact area is limited. In a case where the rotary shaft on which the seal ring is mounted has a large eccentricity, it is impossible to allow the concave portion to have a large area.

The seal ring of the patent document 3 having inclined side surface has a smaller sliding contact area than the seal ring having the concave portion (groove) formed on the side surface thereof and thus has a low torque in an initial stage of operation. But with the progress of wear, the torque may become higher. In the case of the seal ring of the patent document 2 having the curved concave portion, the sliding contact area increases greatly with the progress of wear. Thus, there is a fear that the torque becomes higher.

The present invention has been made to deal with the above-described problems. Therefore, it is an object of the present invention to provide a seal ring capable of maintaining excellent low torque generation performance for a long term.

Means for Solving the Problem

The seal ring of the present invention is mounted on an annular groove formed on one member consisting of either a housing having a shaft hole or a rotary shaft inserted into the shaft hole, partly projects from the annular groove and contacts a surface of other member consisting of either the housing or the rotary shaft, and slidably contacts a side wall surface of the annular groove at a non-sealed fluid side thereof, thereby sealing an annular gap between the one member and the other member. An outer diameter side of the side surface of the ring to be subjected to at least the side wall surface of the annular groove is formed as an inclined surface having an inclined angle in such a way as to decrease a width of the ring from the outer diameter side of the side surface of the ring to an inner diameter side of the side surface thereof. A concave portion which does not contact the side wall surface of the annular groove and communicates with an inner circumferential surface of the ring is formed on a portion of the inner diameter side of the side surface of the ring not projecting from the annular groove.

An inclined angle of the inclined surface with respect to a plane perpendicular to an axial direction of the seal ring is set to a range of 1.5 to 5 degrees.

The concave portion is V-shaped along a circumferential direction of the seal ring. A depth of the concave portion from the sliding contact surface becomes shallower from a deepest portion disposed at a position other than ends of the concave portion in the circumferential direction of the ring toward both ends thereof in the circumferential direction of the ring and is constant in a radial direction of the ring. A boundary portion disposed between the ends of the concave portion in the circumferential direction of the ring and the sliding contact surface is formed at a steep angle with the sliding contact surface.

A plurality of the concave portions is formed by spacing the concave portions at certain intervals in the circumferential direction of the seal ring.

An opening dimension of an outer diameter side of the concave portion is set larger than that of an inner diameter side thereof.

Effect of the Invention

In the seal ring of the present invention, because the outer diameter side of the side surface of the ring is formed as the inclined surface (tapered surface) in the initial sliding contact of the seal ring with the side wall surface of the annular groove, the sliding contact area of the side surface of the ring is small. Because the concave portion which does not contact the side wall surface of the annular groove and communicates with the inner circumferential surface of the ring is formed on the portion of the inner diameter side of the side surface of the ring not projecting from the annular groove, the hydraulic oil or the like which is the sealed fluid is restrained from flowing to the clearance between the housing and the rotary shaft, whereas the hydraulic oil or the like is allowed to moderately flow to the sliding contact surface through the concave portion. Therefore, the torque is low in the initial stage of the operation. Further, the concave portion allows the inner diameter side of the side surface of the ring to have a small sliding contact area and the oil to moderately flow to the sliding contact surface. Therefore, when the wear of the inclined outer diameter side of the side surface of the ring proceeds with the lapse of time, the torque can be prevented from becoming high. Consequently, the seal ring is capable of maintaining excellent low torque generation performance for a long term.

The inclined angle of the inclined surface with respect to a plane perpendicular to an axial direction of the seal ring is set to a range of 1.5 to 5 degrees. Thus, the seal ring is excellent overall in its sealing performance, low torque generation performance, and low friction property.

The depth of the concave portion from the sliding contact surface becomes shallower from the deepest portion disposed at the position other than the ends of the concave portion in the circumferential direction of the ring toward both ends thereof in the circumferential direction of the ring and is constant in the radial direction of the ring. This construction of the concave portion allows the hydraulic oil or the like which is the sealed fluid to easily flow to the portion of the sliding contact surface (the side surface of the seal ring) disposed between the adjacent concave portions. Thus, the seal ring has sufficient low torque generation performance.

The boundary portion disposed between the ends of the concave portion in the circumferential direction of the seal ring and the sliding contact surface is formed at a steep angle with the sliding contact surface. This construction allows the opening area of the concave portion to decrease to a lower extent with the progress of the wear of the sliding contact surface. Thereby there is no change in the extent of the torque.

The hydraulic oil or the like which has flowed into the concave portion flows out to the sliding contact surface owing to the rotation of the seal ring relative to the rotary shaft. By setting the opening dimension of the outer diameter side of the concave portion larger than that of the inner diameter side of the concave portion, a large amount of the hydraulic oil or the like is allowed to flow to the sliding contact surface. Thereby the seal ring displays sufficient low torque generation performance.

MODE FOR CARRYING OUT THE INVENTION

The seal ring of the present invention is characterized by a construction in which a side surface is composed of (1) an outer diameter side formed as an inclined surface and (2) an inner diameter side having predetermined concave portions.

Figure 1:
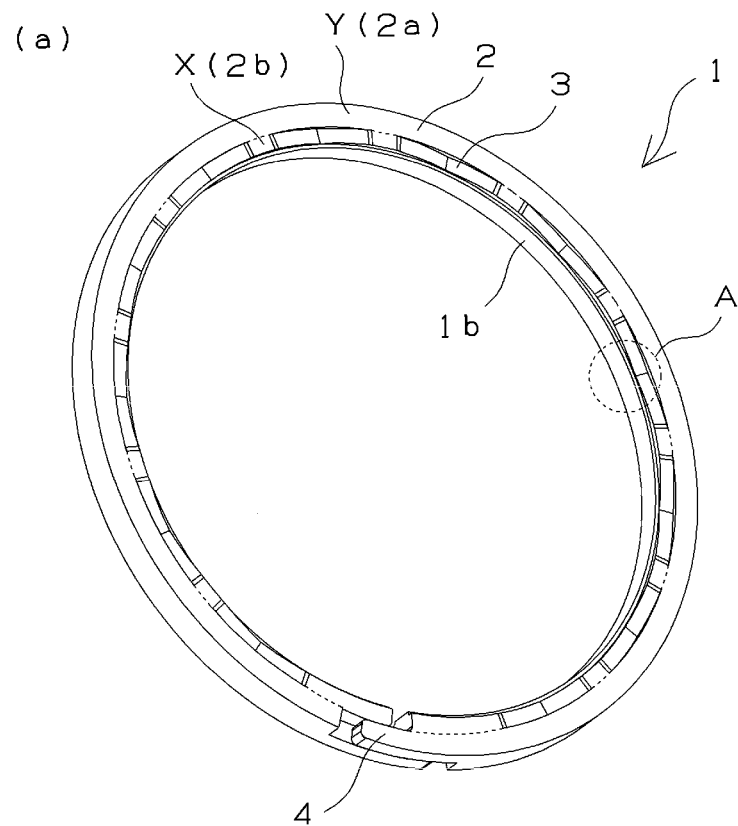
FIG. 1 is perspective and sectional views showing one example of a seal ring of the present invention.
Figure 1:
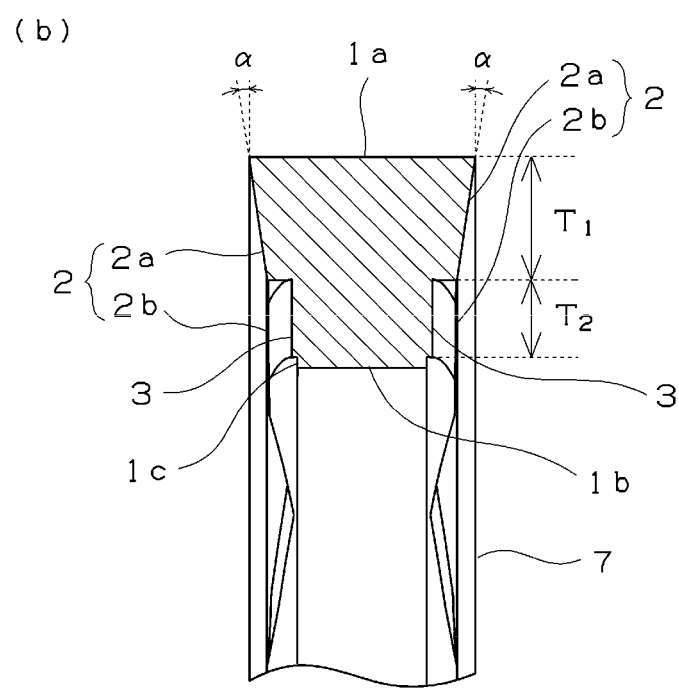
Figure 2:
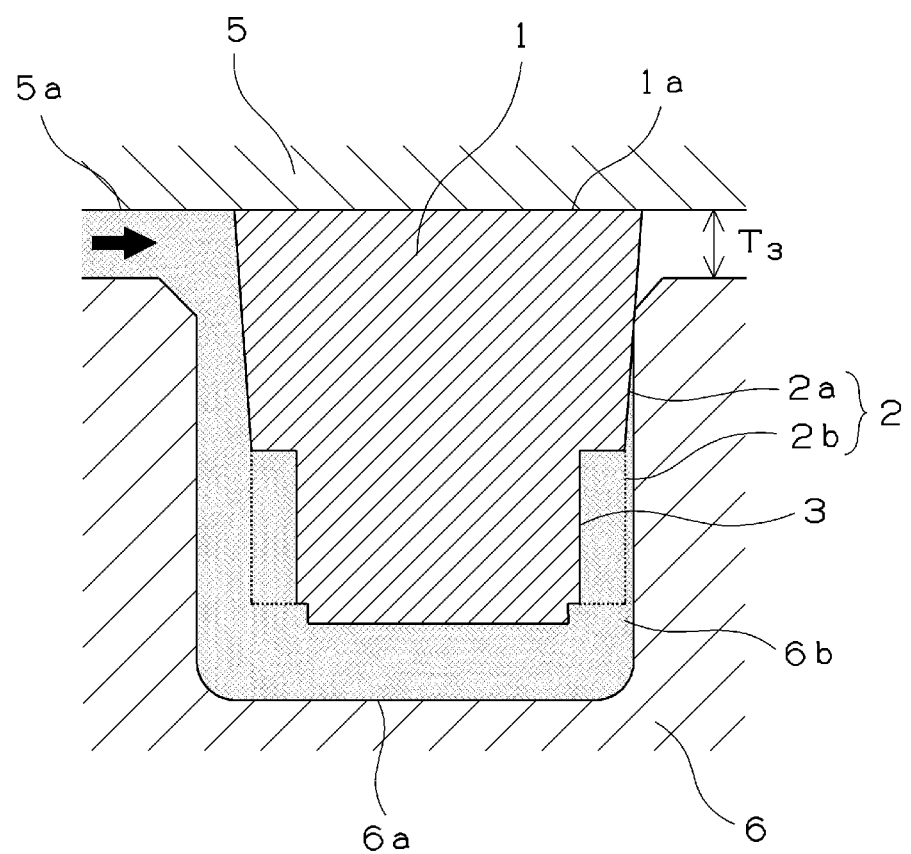
FIG. 2 is a sectional view showing a state in which the seal ring shown in FIG. 1 is mounted on an annular groove.

One example of the seal ring of the present invention is described below based on FIGS. 1 and 2. FIG. 1(*a*) is a perspective view showing the seal ring. FIG. 1(*b*) is a partly enlarged sectional view showing the seal ring shown in FIG. 1(*a*). FIG. 2 is a sectional view showing a state in which the seal ring is mounted on an annular groove of a hydraulic apparatus. As shown in FIGS. 1(*a*) and 1(*b*), the seal ring 1 is an annular body which is approximately rectangular in a sectional view and has one abutment 4. An outer diameter side 2*a* of each of both side surfaces 2 of the ring is formed as an inclined surface (tapered surface) having an inclined angle in such a way as to decrease the width of the ring from the outer diameter side to the inner diameter side thereof. The inner diameter side 2*b* of each of both side surfaces 2 of the ring has concave portions 3 communicating with an inner circumferential surface 1*b* of the ring. A plurality of the V-shaped concave portions 3 is formed along a circumferential direction of the ring by spacing them at certain intervals. Corners formed between the inner circumferential surface 1*b* of the ring and both side surfaces 2 (including the concave portions 3) may be chamfered linearly or curvingly.

In producing the seal ring by injection molding, a stepped portion 1c which is a portion to be projected from a die may be formed at each corner.

As shown in FIG. 2, the seal ring 1 is mounted on an annular groove 6a formed on a rotary shaft 6 inserted into a shaft hole 5a of a housing 5. The arrow shown in FIG. 2 indicates a direction in which the pressure of hydraulic oil is applied to the seal ring. An unsealed fluid side is disposed at the right-hand side in FIG. 2. The side surface 2 of the seal ring 1 disposed at its right-hand side slidably contacts a side wall surface 6b of the annular groove 6a disposed at the unsealed fluid side thereof. An outer circumferential surface 1a of the seal ring contacts an inner circumferential surface of the shaft hole 5a. This sealing construction seals an annular gap disposed between the rotary shaft 6 and the shaft hole 5a. The sealing construction is also applicable to a construction in which the annular groove is formed not at a rotary shaft side but at a housing side. In dependence on use, a suitable kind of the hydraulic oil is used. In the present invention, conditions in which oil temperature is 30 to 150 degrees C., oil pressure is 0.5 to 3.0 MPa, and the number of rotations of the rotary shaft is 1000 to 7000 rpm are assumed.

A cut type seal ring having one abutment 4 (see FIG. 1) is used as the seal ring 1. The seal ring is mounted on the annular groove 6a owing to an increase in its diameter caused by elastic deformation. Because the seal ring 1 has the abutment 4, the diameter of the seal ring is increased by the hydraulic pressure of the hydraulic oil during the use of the seal ring. Thereby the outer circumferential surface 1a of the seal ring closely contacts the inner circumferential surface of the shaft hole 5a. Regarding the configuration of the abutment 4, it is possible to adopt a straight-cut type or an angle-cut type. But it is preferable to adopt a complex cut type shown in FIG. 1(a) because the complex cut type is excellent in its sealing performance.

Of the side surfaces of the ring 2, (1) the outer diameter side 2a formed as the inclined surface is described in detail below.

The outer diameter side 2a of each of both side surfaces 2 of the ring is formed as the inclined surface (tapered surface) having the inclination angle formed in such a way as to decrease the width of the ring from the outer diameter side of each side surface to the inner diameter side thereof. It is favorable to set an inclined angle α to a range of 1.5 to 5 degrees with respect to a plane 7 perpendicular to the axial direction of the seal ring. It is more favorable to set the inclined angle α to 1.5 to 3 degrees. In a case where the inclined angle α is less than 1.5 degrees, there is a possibility that a sufficient torque decrease cannot be obtained. In a case where the inclined angle α exceeds five degrees, there is a possibility that oil leak increases rapidly.

Although the inclined angle α can be formed on only one side surface of the ring 2 which contacts the side wall surface of the annular groove (see FIG. 2), it is preferable to form both side surfaces of the seal ring 1 as the bisymmetrical inclined surfaces having the predetermined inclined angle α because this form eliminates the need for controlling the direction in which the seal ring is mounted on the annular groove, as shown in FIG. 1(b). There is a case in which the side wall surface 6b of the annular groove 6a shown in FIG. 2 is inclined slightly (about one degree) with respect to a plane perpendicular to the rotational axis direction to discharge chips generated by byte processing or sags generated at a polishing time. The seal ring of the present invention is applicable to this case. An especially preferable form of the side wall surface 6b of the annular groove 6a in the present invention is that the side wall surface of the annular groove is perpendicular (non-inclined) to the rotation axis direction.

As shown in FIG. 2, the outer circumferential surface 1a of the ring is parallel with the axial direction of the seal ring 1 and with the inner circumferential surface of the shaft hole 5a of the housing 5 to which the outer circumferential surface 1a is subjected to sliding contact. The outer circumferential surface 1a is vertical to a plane perpendicular to the axial direction of the seal ring. Because the outer circumferential surface 1a of the ring does not incline in the axial direction of the seal ring and is parallel with the inner circumferential surface of the shaft hole 5a, the inner circumferential surface of the shaft hole 5a and the outer circumferential surface 1a of the ring hardly wear when both are subjected to sliding contact with each other. Because the outer circumferential surface 1a of the ring and the inner circumferential surface of the shaft hole 5a of the housing 5 are parallel with each other and closely contact each other, the posture of the seal ring is kept constant without inclining inside the annular groove. This construction allows the position (inclined angle) of the inclined surface of the outer diameter side 2a of the side surface of the ring to be kept constant with respect to the side wall surface 6b of the annular groove 6a and a low torque to be maintained for a long term.

Of the side surfaces 2 of the ring, (2) the inner diameter side 2b having the predetermined concave portions 3 formed thereon is described in detail below.

In the seal ring 1 having the form shown in FIGS. 1 and 2, one side surface 2 of the seal ring is subjected to the sliding contact with the side wall surface 6b of the annular groove 6a. The V-shaped concave portions 3 not subjected to sliding contact with the side wall surface of the annular groove are formed on the inner diameter side 2b of the side surface 2 of the ring. The concave portions 3 allow the hydraulic oil or the like which is a sealed fluid to easily and moderately flow to the sliding contact surface therethrough. In more detail, as shown in FIG. 1(a), a boundary portion between a sliding contact surface X disposed between adjacent concave portions and the concave portions has a continuous configuration, whereas a boundary portion between a sliding contact surface Y disposed outward from the concave portions and the concave portions has an uncontinuous configuration (stepped portion). This construction allows the hydraulic oil or the like to easily flow to the sliding contact surface X, but does not allow the hydraulic oil or the like to easily flow to the sliding contact surface Y. The sliding contact surface Y is the inclined surface formed on the outer diameter side 2a of the side surface 2 of the ring. Owing to the flow of the hydraulic oil which is the sealed fluid to the sliding contact surfaces X and Y, it is possible to form an oil film on the sliding contact surfaces X and Y and thus generate torque and wear to a low extent. In addition, small oil leak can be achieved by restraining a part of the hydraulic oil from flowing to the inclined surface (sliding contact surface Y) formed on the outer diameter side of the side surface of the ring by means of the uncontinuous stepped portion.

It is preferable to form portions of the inner diameter side 2b of the side surface of the ring except for the concave portions, namely, a surface (sliding contact surface X) of the inner diameter side 2b between adjacent concave portions as non-inclined surfaces (surface perpendicular to axial direction of the seal ring) continuous with the end portion of the inner diameter side of the inclined surface of the outer diameter side 2a of the side surface. The concave portions 3 are concave as viewed from the surface (sliding contact surface X) of the inner diameter side 2*b*.

The concave portions can be formed on at least one side surface of the ring subjected to the sliding contact with the side wall surface 6*b* of the annular groove 6*a*. But as shown in FIG. 1(*b*), it is preferable to form the concave portions on both side surfaces of the seal ring symmetrically to eliminate the need for controlling the direction in which the seal ring is mounted on the annular groove as in the case of the inclined surface of the outer diameter side of the side surface of the seal ring.

As shown in FIG. 1, it is preferable to form a plurality of the concave portions 3 by spacing them at certain intervals in the circumferential direction of the seal ring. Each portion of the side surface 2 of the seal ring disposed between adjacent concave portions constitutes the sliding contact surface X of the inner diameter side 2*b* of the ring. It is possible to form an oil film on the portion of the sliding contact surface between the adjacent concave portions during the use of the seal ring and thereby generate the torque and the wear to a low extent. It is preferable to set the length of each concave portion in the circumferential direction of the seal ring to 3 to 20% of the entire circumference of the seal ring in dependence on the number of the concave portions to be formed. It is also preferable to form a plurality of the concave portions having an equal size by spacing them at approximately regular intervals (in FIG. 1, 12 concave portions are formed on one side surface of the seal ring) because this construction of the concave portions allows the sliding contact property of the seal ring to be stable.

Figure 3:
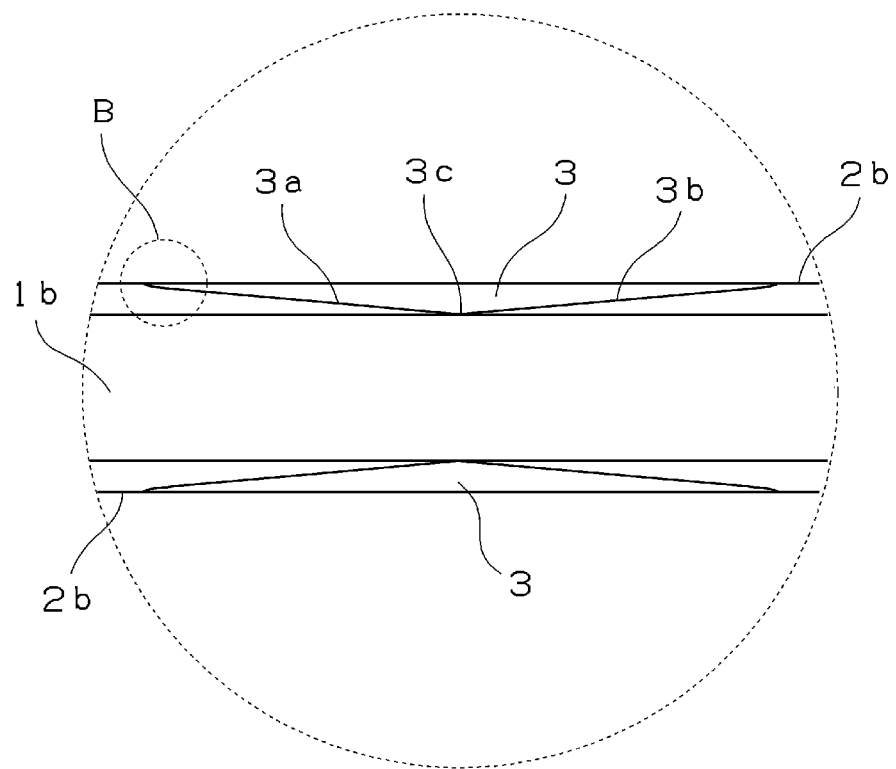
FIG. 3 shows a portion of the seal ring as viewed from an inner diameter side of the seal ring.

The V-shaped concave portion is described in detail below with reference to FIG. 3. FIG. 3 shows a portion (portion A in FIG. 1) of the seal ring of the present invention, as viewed from an inner diameter side of the seal ring. The inclined surface of the outer diameter side of the end surface of the ring is not drawn in FIG. 3. As shown in FIG. 3, the concave portion 3 is V-shaped along the circumferential direction of the seal ring. One of the inner diameter sides 2*b* of the side surface of the seal ring is the sliding contact surface X subjected to the sliding contact surface with the annular groove. The depth of the concave portion 3 from the sliding contact surface X of the concave portion 3 becomes shallower from a deepest portion 3*c* toward its both ends in the circumferential direction of the ring. The deepest portion 3*c* is disposed at a position other than both ends of the concave portion 3 in the circumferential direction of the seal ring. That is, the depth of the concave portion becomes gradually shallower as a bottom surface thereof approaches the sliding contact surface X in the circumferential direction of the seal ring. The depth of the concave portion 3 from the sliding contact surface X is constant in the radial direction of the seal ring. In the example shown in FIGS. 1 and 3, the bottom surface of the concave portion 3 is constructed of flat surfaces 3*a* and 3*b* inclined along the circumferential direction of the seal ring from the sliding contact surface toward the center of the concave portion in the width direction thereof.

In the example shown in FIGS. 1 and 3, the deepest portion 3*c* is disposed at the central position of the concave portion 3 in the circumferential direction of the seal ring. But the position of the deepest portion is not limited thereto. In this example, the bottom surface of the concave portion 3 is constructed of the flat surfaces 3*a* and 3*b* tilting along the circumferential direction of the seal ring, but may be constructed not of the flat surface but of a curved surface. In addition to the V-shaped configuration formed by only connecting the flat surfaces 3*a* and 3*b* to each other, the deepest portion 3*c* may have a curved configuration or a horizontal configuration. The deepest portion 3*c* having the curved configuration or the horizontal configuration does not adversely affect the effect in decreasing the torque.

It is favorable to set the depth of the deepest portion 3*c* of the concave portion 3 from the sliding contact surface to not more than 45% of the total width of the seal ring and more favorable to set the depth thereof from the sliding contact surface to not more than 30% of the total width of the seal ring. In the case where the concave portion is formed on both side surfaces of the seal ring, the "depth" means the total of the depth of the concave portion formed on one side surface of the seal ring and that of the concave portion formed on the other side surface thereof. In the case where the depth of the concave portion exceeds 45% of the total width of the seal ring, there is a fear that the seal ring may be deformed to a high extent during the use thereof.

Figure 4:
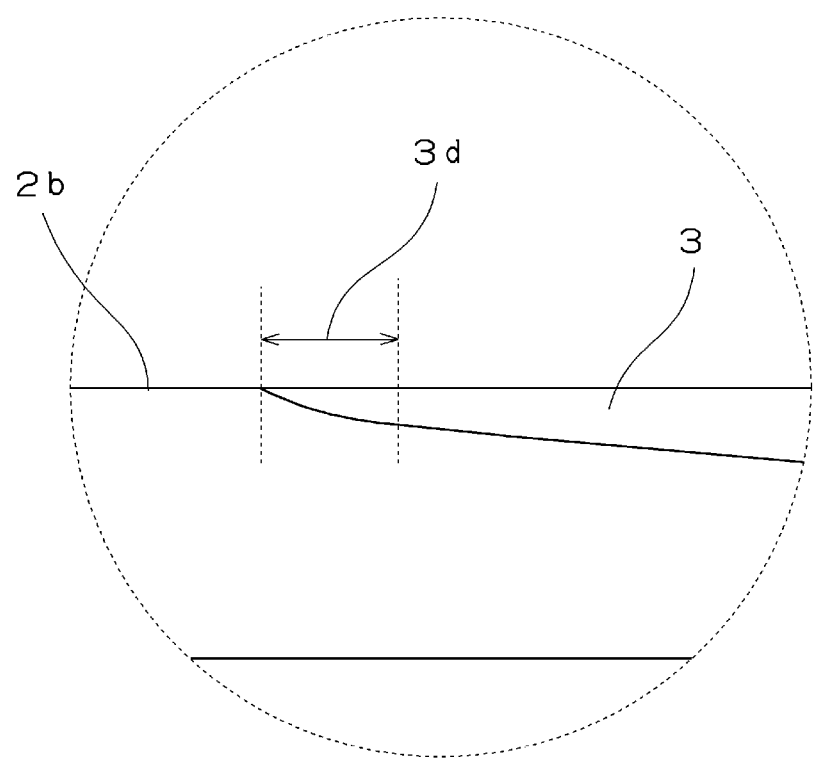
FIG. 4 is an enlarged view of a portion B shown in FIG. 3.
Figure 5:
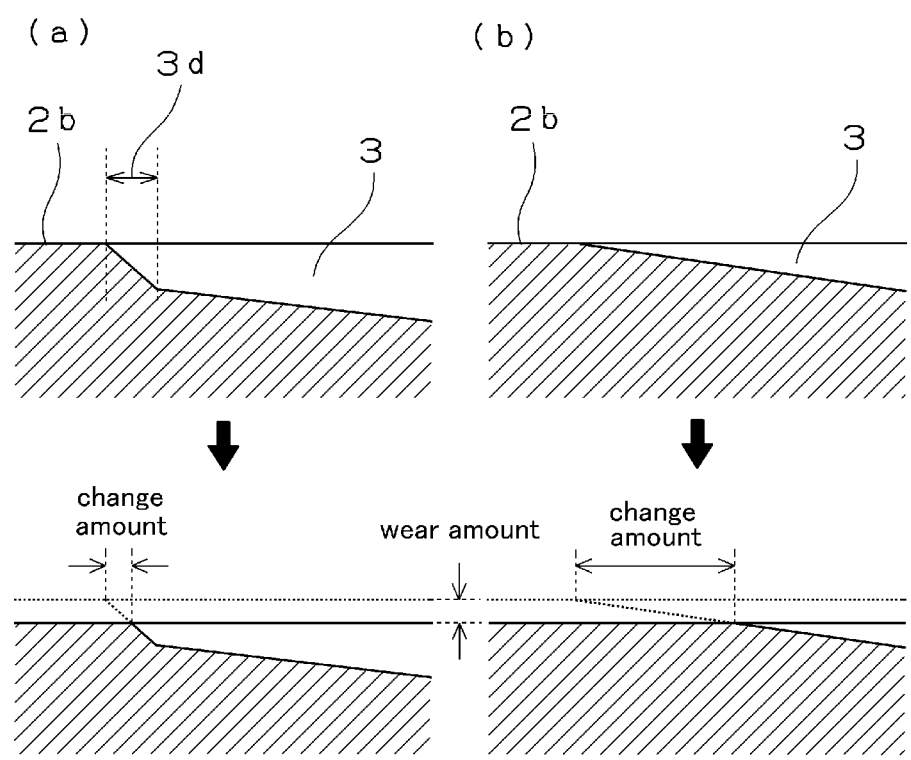
FIG. 5 is a sectional view showing one example of a boundary portion.

A boundary portion between both ends of the concave portion in the circumferential direction of the seal ring and the sliding contact surface is described below with reference to FIGS. 4 and 5. FIG. 4 is an enlarged view of a portion B shown in FIG. 3. FIG. 5 is an enlarged sectional view showing one example of the boundary portion. As shown in FIG. 5(*a*), it is preferable that a boundary portion 3*d* between both ends of the concave portion 3 in the circumferential direction of the seal ring and the sliding contact surface (side surface 2*b* of the seal ring) forms a steep gradient with the sliding contact surface. That is, it is preferable to set the gradient of the boundary portion with respect to the sliding contact surface larger than the gradients of portions other than the boundary portion 3*d* with respect to the sliding contact surface. This construction allows the opening space of the concave portion to decrease to a lower extent than a case in which the steep gradient is not formed (FIG. 5(*b*)), when the sliding contact surface wears to the same extent in the construction where the steep gradient is formed and the construction where the steep gradient is not formed. Thereby there is no change in the extent of the torque. The steep gradient can be formed by convexly rounding the concave portion at a central side thereof in the width direction of the seal ring. By rounding the boundary portion 3*d* having a steep gradient, the hydraulic oil or the like which is the sealed fluid is allowed to easily flow to the sliding contact surface. Thereby the seal ring is allowed to have low torque generation performance to a higher extent.

Figure 6:
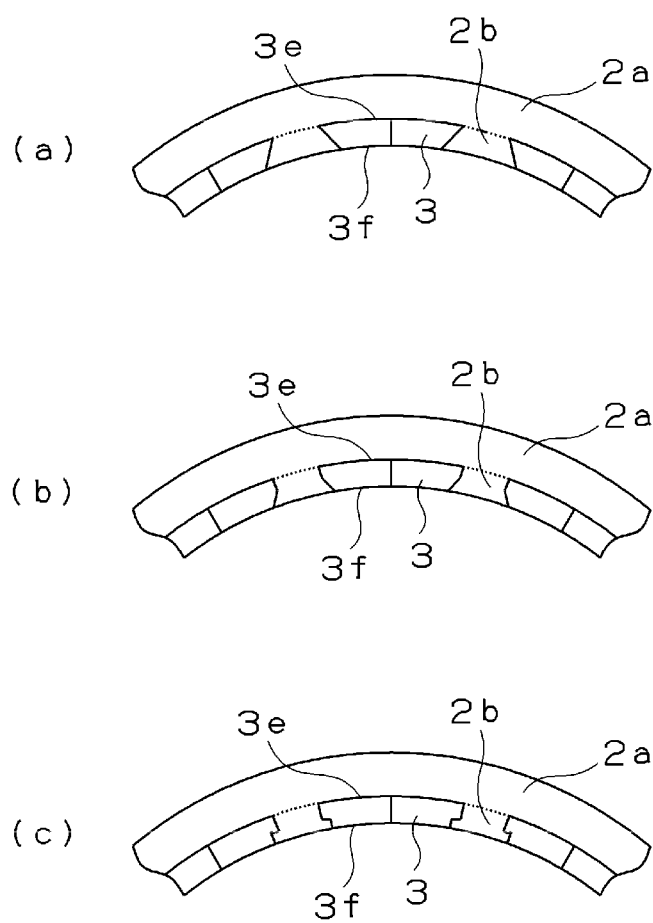
FIG. 6 shows another embodiment of a V-shaped concave portion.

The V-shaped concave portions of other modes are described below with reference to FIG. 6. FIGS. 6(*a*) through 6(*c*) show the V-shaped concave portions of the seal ring, as viewed from the front direction thereof. As shown in FIGS. 6(*a*) through 6(*c*), in these modes, each of the V-shaped concave portions is so designed that the opening dimension of an outer diameter side 3*e* of the V-shaped concave portion 3 of each mode is set larger than that of an inner diameter side 3*f* thereof. That is, on the side surface 2 of the seal ring, the front configuration of the V-shaped concave portion 3 which is the surface not contacting the side wall surface of the annular groove is so formed that the non-contact area of the outer diameter side 3*e* of the V-shaped concave portion is larger than that of the inner diameter side 3*f* thereof. By so designing the V-shaped concave portion that the opening dimension of the inner diameter side thereof is set smaller than that of the outer diameter side thereof, when the hydraulic oil or the like which has flowed into the V-shaped concave portion flows out therefrom owing to a rotation of the seal ring relative to the rotary shaft, the hydraulic oil or the like is allowed to flow to the sliding contact surface in a larger amount than the V-shaped concave portion having a construction in which the opening dimension of the inner diameter side of the V-shaped concave portion is equal to that of the outer diameter side thereof. This is because when the hydraulic oil or the like which has flowed out of the V-shaped concave portion collides with the ends thereof in the circumferential direction thereof, it is possible to reduce the amount of the hydraulic oil or the like which flows to the inner diameter side of the seal ring.

As described above, the seal ring of the present invention has the construction composed of (1) the outer diameter side formed as the inclined surface on the side surface of the ring and (2) the inner diameter side having the predetermined concave portions. As shown in FIG. 1(b), the relationship between the thickness of the seal ring and a length $T_1$ of the outer diameter side 2a as well as a length $T_2$ of the inner diameter side 2b is not specifically limited so long as the concave portions 3 formed on the inner diameter side 2b projects beyond the annular groove to such an extent as to prevent the hydraulic oil or the like which is the sealed fluid from leaking to the clearance between the housing and the rotary shaft. By setting the length $T_1$ of the outer diameter side 2a to not less than the length of a clearance $T_3$ between the housing and the rotary shaft (see FIG. 2), the concave portion 3 is not disposed in the clearance between the housing and the rotary shaft, even though the concave portion 3 is formed in a width equal to the length $T_2$ on the inner diameter side 2b. More specifically, it is favorable to set the length $T_1$ of the outer diameter side 2a longer than the length of the clearance $T_3$ between the housing and the rotary shaft by 0.1 to 0.5 mm and more favorable to set the length $T_1$ of the outer diameter side 2a longer than the length of the clearance $T_3$ by 0.1 to 0.3 mm.

The material for the seal ring of the present invention is not specifically limited. But considering that the concave portion is formed on the side surface of the seal ring and that the seal ring is mounted on the groove owing to an increase in the diameter thereof caused by the elastic deformation thereof, it is preferable to form the seal ring as a molded body consisting of synthetic resin. Examples of synthetic resin which can be used in the present invention include thermosetting polyimide resin, thermoplastic polyimide resin, polyether ketone ether ketone ketone resin, polyether ketone resin, polyether ether ketone (hereinafter referred to as PFEK) resin, wholly aromatic polyester resin, fluororesin such as polytetrafluoroethylene (hereinafter referred to as PTFE), polyphenylene sulfide (hereinafter referred to as PPS), polyamide imide resin, and polyamide resin. It is possible to use these resins singly or as polymer alloys obtained by mixing not less than two kinds thereof with each other.

It is preferable to produce the seal ring as an injection molded body obtained by injection molding the synthetic resin because the injection molded body allows the seal ring which has the above-described concave portion and the abutment of the composite step cut type to be produced easily at a low cost, generates a lower rotation torque than the seal ring produced by machining work, and operates stably. Therefore, it is preferable to use injection-moldable thermoplastic resins as the synthetic resin. Especially among the thermoplastic resins, it is preferable to use the PEEK resin or the PPS resin because these resins are excellent in the friction and wear property, bending elastic modulus, heat resistance, and sliding contact property thereof. These resins have a high modulus of elasticity and thus are not broken when the diameter of the seal ring consisting of these resins increases in mounting the seal ring on the groove. Further the seal ring can be used even when the temperature of the sealed hydraulic oil becomes high. In addition, there is no fear of the occurrence of solvent crack.

It is possible to add a fibrous reinforcing material such as carbon fiber, glass fiber, and aramid fiber; spherical filler such as spherical silica and spherical carbon; a scaly reinforcing material such as mica and talc; and a microfiber reinforcing material such as potassium titanate whisker to the above-described synthetic resins as necessary. In addition, it is also possible to add a solid lubricant such as PTFE resin, graphite, and molybdenum disulfide; and a sliding reinforcing material such calcium phosphate, and calcium sulfate; and carbon black to the synthetic resins. These substances can be added to the synthetic resins singly or in combination. A material containing the PEEK resin or the PPS resin to which the carbon fiber which is the fibrous reinforcing material and the PTFE resin which is the solid lubricant are added is preferable because the material is capable of easily obtaining the property demanded for the seal ring of the present invention. The addition of the carbon fiber to the PEEK resin or the PPS resin allows the material for the seal ring to have improved mechanical strength such as bending elastic modulus. The addition of the PTFE resin to the PEEK resin or the PPS resin allows the material to have improved sliding contact property.

In producing the seal ring consisting of the synthetic resin, the above-described materials are fused and kneaded to form a molding pellet. Thereafter the pellet is molded into a predetermined configuration by using a known injection molding method. In the case where the seal ring is produced by the injection molding, a gate position is not specifically limited. But it is preferable to form the gate position on the inner circumferential surface of the seal ring from the standpoint of securing the sealing performance of the seal ring and non-requirement of post processing. In addition, it is preferable to form the gate position at a portion of the inner circumferential surface of the seal ring opposed to the abutment from the viewpoint of a flow balance in the injection molding.

EXAMPLES

Example 1 and Comparative Examples 1 and 2

Figure 10:
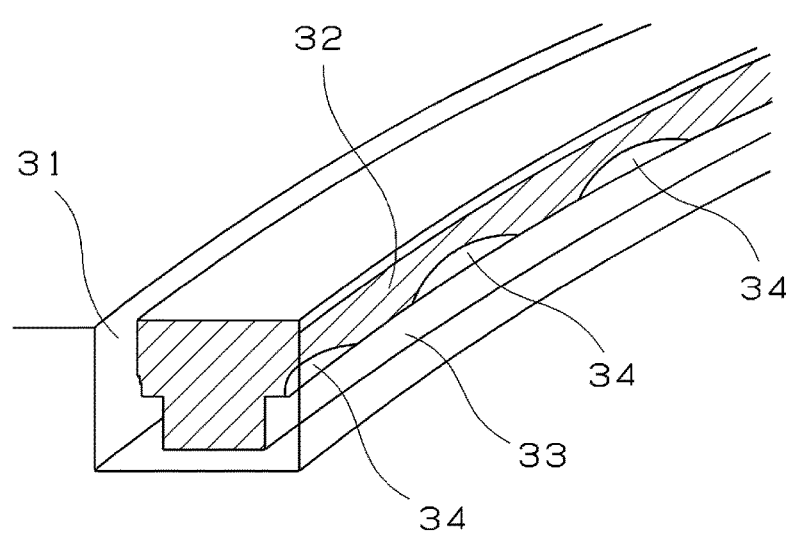
FIG. 10 shows another example of the conventional seal rings.
Figure 11:
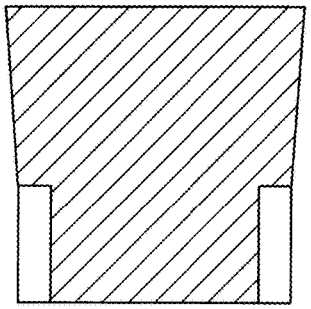
Figure 11:
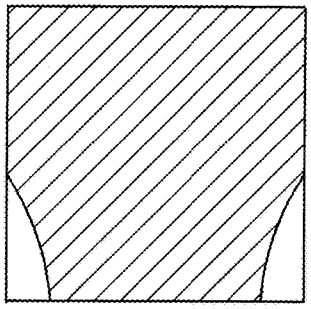
Figure 11:
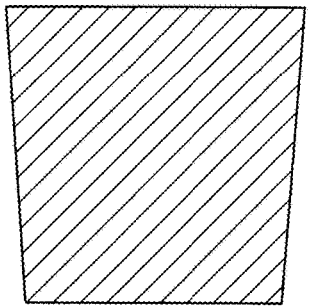

By using a resin composition (NTN Precision Resin Co., Ltd.: BarryPK5301) containing the PEEK resin as its main component, the carbon fiber, and the PTFE resin, seal bearings (outer diameter: φ48 mm, inner diameter: φ44 mm, maximum width of seal ring: 2.3 mm, and thickness of seal ring: 2 mm) having configurations shown in table 1 were produced by using injection molding. In the ring of the example, the inclined angle of the outer diameter side of its side surface was 2.5 degrees. In the ring of the comparative example 1, the curved concave portions shown in FIG. 10 were formed. The sliding contact area of the side surface of the ring obtained by subtracting the areas of the concave portions from the area of the entire side surface was equal to that of the seal ring of the example 1. In the ring of the comparative example 2, the entire side surface thereof was formed as an inclined surface. The inclined angle of the inclined surface was 2.5 degrees.

Figure 7:
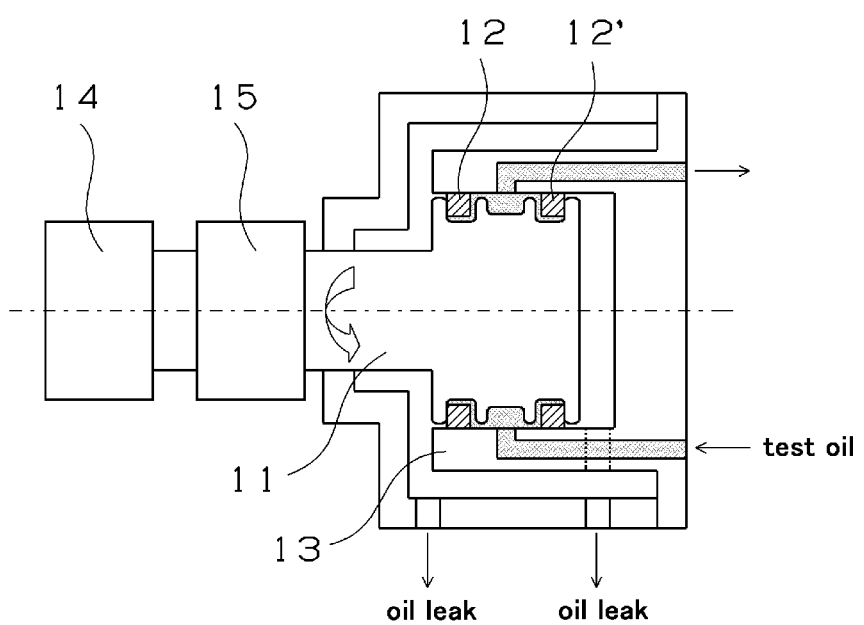
FIG. 7 is a schematic view of a testing machine for testing the properties of seal rings.

To examine the properties of the obtained seal rings, the relationship between the wear amount of the side surface of each ring and the rotation torque thereof as well as the oil leak amount thereof and were evaluated by using a testing machine shown in FIG. 7. FIG. 7 is a schematic view of the testing machine. Seal rings 12, 12' were mounted on an annular groove of a mating shaft 11. The seal rings 12, 12' were subjected to sliding contact with a side wall of the annular groove of the mating shaft 11 and to an inner circumferential surface of a shaft hole of a housing 13. The reference numeral 14 and 15 denote a motor and a torque meter respectively. Test oil was fed under pressure from the right-hand side of the testing machine to supply the test oil to an annular gap between the seal rings 12 and 12'. As conditions, hydraulic pressure: 1.0 MPa, oil temperature: 100 degrees C., and number of rotations: 2000 rpm. The kind of the oil was CVTF.

Figure 8:
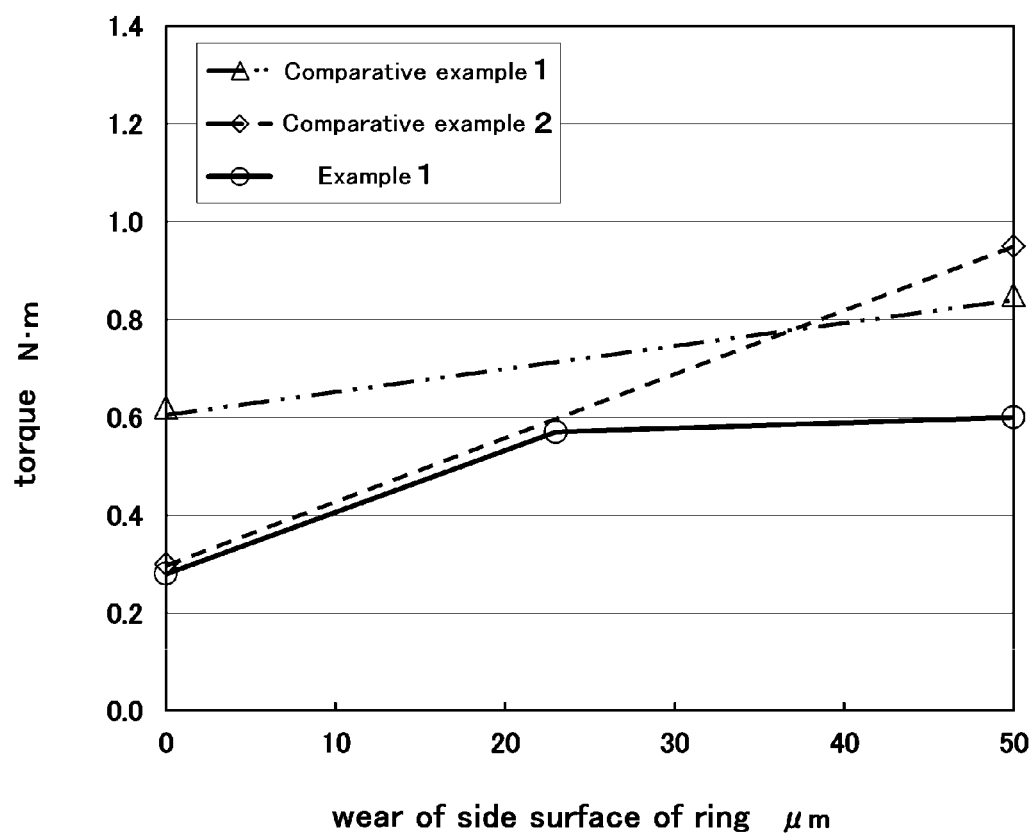
FIG. 8 shows the relationship between a wear amount of a side surface of the ring and a rotation torque.
Figure 9:
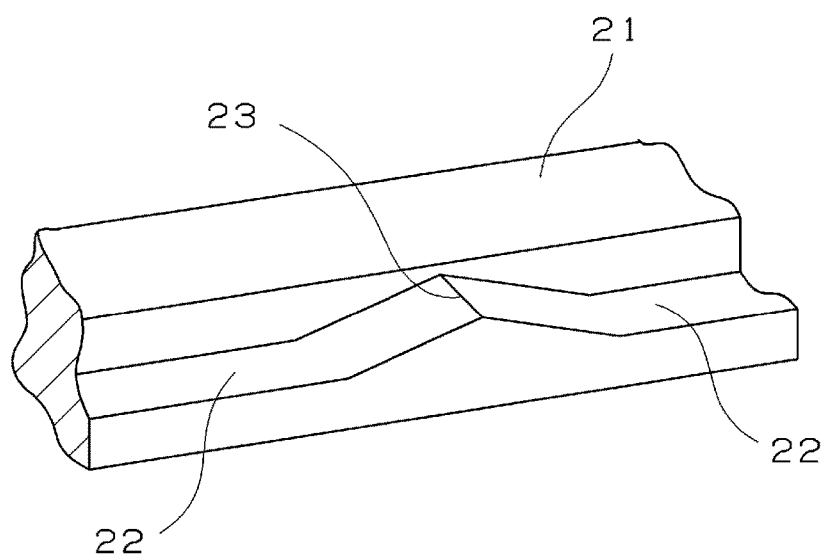
FIG. 9 shows one example of conventional seal rings.

By using the testing machine, the rotation torque (N·mm) of the mating shaft and the oil leak amount (ml/minute) thereof were measured when the wear amount of the side surface of each seal ring had a certain value. FIG. 8 shows the results of the rotation torque test. Table 1 shows the results of the oil leak amount test. Regarding the test results of the oil leak amount, the leak amount of the comparative example 2 at the initial stage (wear of side surface of ring: 0 μm) was set as the reference. A leak amount equal to that of the comparative example 2 was marked by "o", whereas a leak amount smaller than that of the comparative example 2 was marked by "⊚". "Oil leak after wear" in table 1 shows the test result when the wear amount of the side surface of the ring was 50 μm.

As shown in table 8, in the comparative example 2 in which the entire side surface of the ring was formed as the inclined surface, the torque became higher in proportion to the progress of the wear of the side surface of the ring although the torque was low at the initial stage. In the comparative example 2 in which the curved concave portion was formed, the torque was high as a whole, although the increase of the torque with the progress of the wear was small as compared with the increase of the torque in the comparative example 2. On the other hand, in the ring of the example 1, the torque was low from the initial stage, and the torque could be prevented from becoming high with the progress of the wear of the side surface thereof.

INDUSTRIAL APPLICABILITY

Because the seal ring of the present invention is capable of maintain excellent low torque generation performance for a long term, the seal ring can be preferably used for hydraulic equipment such as an AT and a CVT of a car and the like.

EXPLANATION OF REFERENCE NUMERALS AND SYMBOLS

1: seal ring
2: side surface of seal ring
3: V-shaped concave portion
4: abutment
5: housing
6: rotary shaft
7: plane perpendicular to axial direction of seal ring
11: mating shaft
12, 12': seal ring
13: housing
14: motor
15: torque meter

The invention claimed is:

1. A seal ring which is mounted on an annular groove formed on one member consisting of either a housing having a shaft hole or a rotary shaft inserted into said shaft hole, partly projects from said annular groove and contacts a surface of other member consisting of either said housing or said rotary shaft, and slidably contacts a side wall surface of said annular groove at a non-sealed fluid side thereof, thereby sealing an annular gap between said one member and said other member,
   wherein an outer diameter side of said side surface of said ring to be subjected to at least said side wall surface of said annular groove is formed as an inclined surface having an inclined angle in such a way as to decrease a width of said ring from said outer diameter side of said side surface of said ring to an inner diameter side of said side surface thereof;
   said inclined angle of said inclined surface with respect to a plane perpendicular to an axial direction of said seal ring is set to a range of 1.5 to 5 degrees;
   said inner diameter side of said side surface of said ring is formed as a non-inclined surface;
   a concave portion which does not contact said side wall surface of said annular groove and communicates with an inner circumferential surface of said ring is formed on a portion of said inner diameter side of said side surface of said ring not projecting from said annular groove; and
   said concave portion is V-shaped along a circumferential direction of said seal ring.

2. A seal ring according to claim 1, wherein a depth of said concave portion from said sliding contact surface becomes shallower from a deepest portion disposed at a position other than ends of said concave portion in said circumferential direction of said ring toward both ends thereof in said circumferential direction thereof and is constant in a radial direction of said ring.

3. A seal ring according to claim 2, wherein a boundary portion disposed between said ends of said concave portion in said circumferential direction of said ring and said sliding contact surface is formed at a steep angle with said sliding contact surface.

4. A seal ring according to claim 1, wherein a plurality of said concave portions is formed by spacing said concave portions at certain intervals in said circumferential direction of said seal ring.

5. A seal ring according to claim 1, an opening dimension of an outer diameter side of said concave portion is set larger than that of an inner diameter side thereof.

* * * * *